United States Patent

[11] 3,575,050

| [72] | Inventor | Lawrence C. Lynnworth<br>Waltham, Mass. |
|---|---|---|
| [21] | Appl. No. | 781,231 |
| [22] | Filed | Dec. 4, 1968 |
| [45] | Patented | Apr. 13, 1971 |
| [73] | Assignee | Panametrics, Inc.<br>Waltham, Mass. |

[54] FLUID FLOWMETER
18 Claims, 11 Drawing Figs.

[52] U.S. Cl.................................................. 73/194,
73/67.5
[51] Int. Cl..................................................... G01f 1/00
[50] Field of Search........................................73/194 (A),
462; 324/(Inquired), 82, 83, 90; 328/(Inquired);
340/1—14, (Inquired); 181/0.5

[56] References Cited
UNITED STATES PATENTS

| 2,947,172 | 8/1960 | King............................. | 73/462 |
| 2,988,918 | 6/1961 | King............................. | 73/462 |
| 2,959,054 | 11/1960 | Welkowitz................... | 73/194 |
| 2,991,650 | 7/1961 | Katzenstein................. | 73/194 |
| 3,101,608 | 8/1963 | Benson......................... | 73/67.5 |
| 3,246,241 | 4/1966 | Colby............................ | 324/83 |
| 3,302,044 | 1/1967 | Lynnworth.................. | 73/67.5 |
| 3,469,445 | 9/1969 | Moffatt........................ | 73/194 |

OTHER REFERENCES
V. A. Del Grosso et al., External Ultrasonics To Measure Fluid Flow NLR Report 4967 Nov. 12, 1957

*Primary Examiner*—Richard C. Queisser
*Assistant Examiner*—John Whalen
*Attorney*—Kenway, Jenny & Hildreth

ABSTRACT: An ultrasonic flowmeter to measure fluid velocity within a pipe. The device employs, in one embodiment a pair of shear wave transducers positioned on the pipe to propagate shear waves into oblique incidence with the pipe wall-fluid interface. Longitudinal waves are thereby produced by mode conversion and propagated diagonally upstream and downstream in the fluid. The difference in transit time between upstream and downstream components indicates flow velocity. Alternatively, the Doppler shift of the longitudinal wave, after backscattering from a particle or eddy in motion is indicative of fluid velocity.

Patented April 13, 1971

INVENTOR
LAWRENCE C. LYNNWORTH
BY
Kenway, Jenney & Hildreth
ATTORNEYS

INVENTOR
LAWRENCE C. LYNNWORTH

Patented April 13, 1971
3,575,050
6 Sheets-Sheet 4
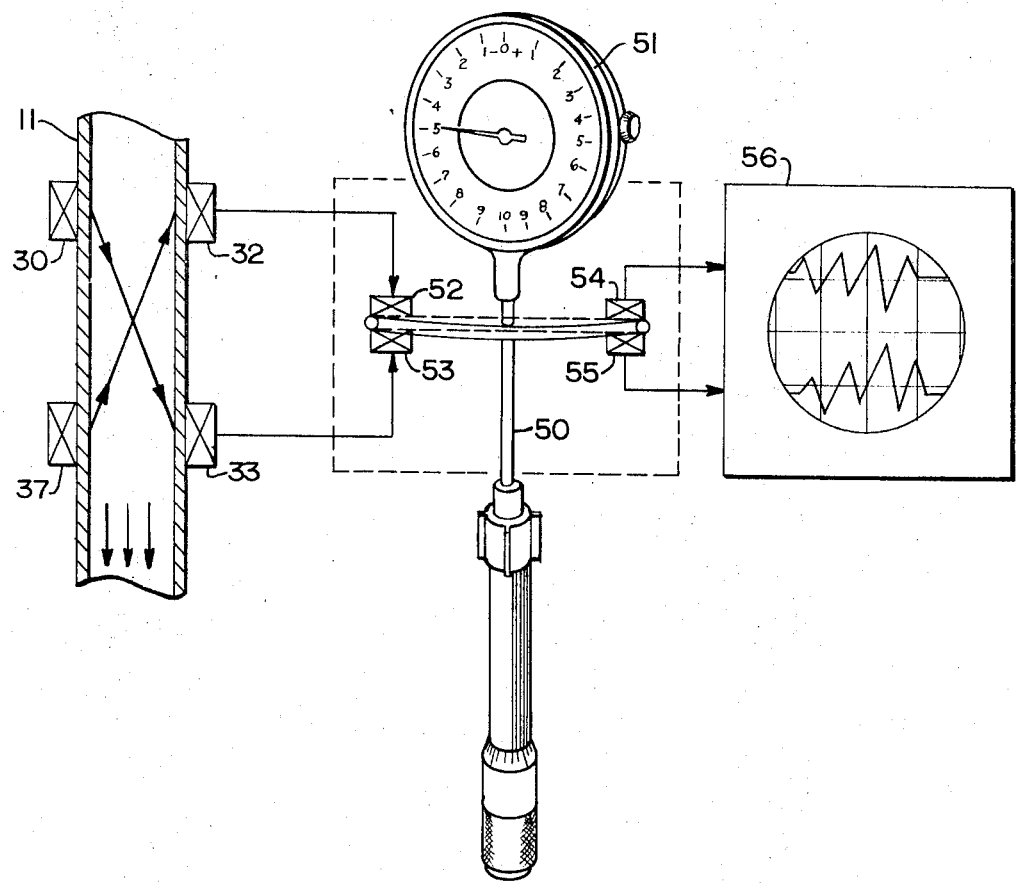
FIG. 7
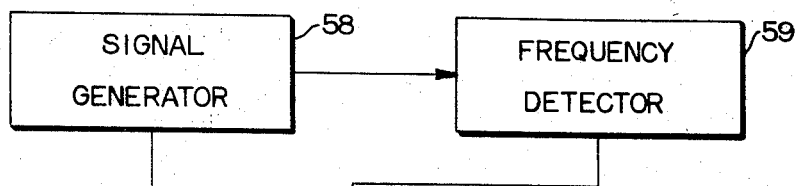
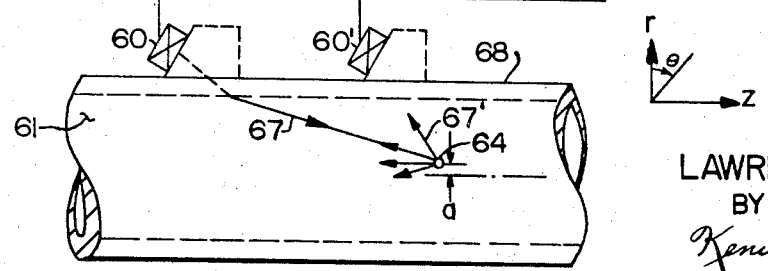
FIG. 8
INVENTOR
LAWRENCE C. LYNNWORTH
BY
*Kenway, Jenney & Hildreth*
ATTORNEYS

INVENTOR
LAWRENCE C. LYNNWORTH
BY
ATTORNEYS

3,575,050

FLUID FLOWMETER

FIELD OF THE INVENTION

This invention relates in general to fluid flowmeters and more particularly to a flowmeter employing ultrasonic transducers for the measurement of fluid flow without perturbation of the flowing material.

BACKGROUND OF THE INVENTION

A number of techniques have been developed for measuring the flow rate of a fluid in a pipe or other conventional conduit. Many of the existing techniques require a mechanical element to be placed within the stream, or that the size or shape of the conduit be varied at the point of the measurement. In both instances the flow itself is perturbed by the sensing mechanism. There have also been a number of flowmeters developed which do not interrupt the fluid stream. Such flowmeters include magnetic flowmeters, eddy current flowmeters and ultrasonic flowmeters. Nuclear magnetic resonance flowmeters for example are, however, limited to use with fluids having a magnetic dipole moment, and may require strong magnets for use with large diameter conduits. The eddy current flowmeter requires an electrically conducting fluid and further is characterized by a nonuniform response to axial motion due to skin effect. In this response the outer layers of fluid nearest to the conduit wall contribute more heavily to the measured result than do those of the inner layers. Since the usual flow velocity profile is opposite to this, that is with the highest velocity near the center and the lowest velocity at the wall, this response can considerably distort the accuracy of the measurement.

Ultrasonic flowmeters have employed measurements of the transmission of longitudinal mode ultrasonic waves through the fluid to determine the average flow velocity. These ultrasonic flowmeters generally average all portions of the fluid path with essentially equal weight. Such a system is, for example, shown in U.S. Pat. No. 3,184,959 which describes a method for relating the actual flow to the ultrasonic average flow measurement through constants which depend upon whether the flow is laminar or turbulent. This approach requires, however, that the ultrasonic probes which include the emitters and receivers pierce the conduit wall and extend into the fluid stream thereby perturbing the flow.

U.S. Pat. Nos. 2,874,568 and 2,923,155 describe ultrasonic flow systems in which the probes do not pierce the conduit wall, but rather are mounted external to the wall. With these arrangements the angle of refraction of the longitudinal wave at the interface between the conduit and fluid is relatively small and hence the ultrasonic waves have only a very minor velocity component in a direction parallel to the axis of fluid flow. With such systems, sensitivity, particularly to low flow rates, is a significant limiting factor.

BRIEF SUMMARY OF THE INVENTION

Broadly speaking, the flowmeter of this invention employs ultrasonic waves in the longitudinal mode transmitted diagonally across the conduit such that there is a very significant component of the velocity in a direction parallel to the axis of flow of the fluid. This is achieved with transducers mounted external to the conduit and hence there is no perturbation of the flow of the fluid stream. The transducers include a generator of shear mode ultrasonic waves which is coupled to the conduit such that the shear waves are obliquely incident on the interface between the conduit and the fluid. These shear waves are mode converted by refraction at the interface into longitudinal waves, which are now transmitted at a much higher angle, typically twice that achievable with an incident longitudinal wave, through the fluid material. Since the ultrasonic waves being transmitted through the fluid have a significant component of velocity in a direction parallel to the axis of flow, the sensitivity of the measurement is greatly increased.

The measurement of flow velocity using the technique of this invention can be made in either of two general ways. In one approach the difference in transit time between a longitudinal wave traveling diagonally downstream and one traveling diagonally upstream provides the basis for a determination of the average flow velocity. This determination of transit time may be made, for example, by clocking the time difference between two video pulses or alternatively by measuring the phase shift between emitted continuous waves or bursts of continuous wave energy.

The second general technique employed in the practice of this invention consists of transmitting ultrasonic waves into the fluid with a significant component of velocity in a direction parallel to the fluid flow and measuring the Doppler shift produced in the wave backscattered from particles in the fluid stream. These particles need not necessarily differ in composition from the fluid stream, but may consist of interfaces of eddies or turbulence. This same technique may be employed to measure nonaxial flow. For example, it can be used to measure stirring velocity where the direction of the flow in the fluid is circumferential within a cylindrical container.

In specific embodiments, using either technique, the flow velocity at selected radial positions may be determined, thereby providing the basis for measuring a radial profile of flow velocities. By summing the velocities at each radial position, with appropriate weighting factors, a precise measure of the total flow may be obtained.

DESCRIPTION OF THE DRAWINGS

In the drawings:

FIG. 7 is an illustration partially in perspective view and partially in block diagrammatic form of a second embodiment of a phase shift detector useful in the practice of this invention;

FIG. 8 is an illustration partially in perspective view and partially in block diagrammatic form of another embodiment of a flowmeter constructed in accordance with the principles of this invention;

DESCRIPTION OF THE PREFERRED EMBODIMENTS

Figure 1:
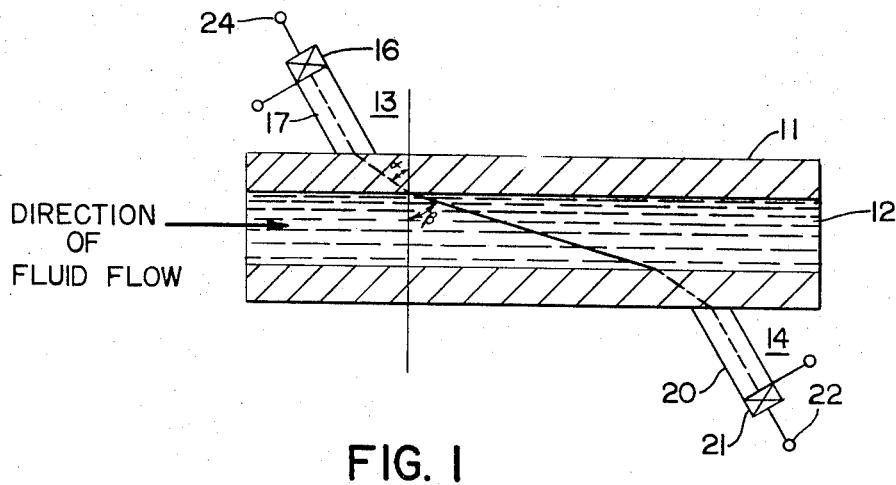
FIG. 1 is an illustration in sectional view of one embodiment of a flow-measuring device constructed in accordance with the principles of this invention.

Referring to FIG. 1, there is illustrated one embodiment of the basic elements of the flowmeter of the invention. The fluid 12, confined within a pipe or conduit 11, has an axial flow as indicated by the arrow. An ultrasonic transducer assembly 13 which consists of a shear wave generating crystal 16 and a coupling wedge 17 is coupled to the outer surface of the pipe 11. The transducer 16 is typically a ½-inch diameter Y-cut quartz crystal resonant at 1 to 10 MHz. or, alternatively, an X-cut (shear wave) lithium niobate crystal The crystals may be operated in either the pulse mode or in a continuous mode. The coupling wedge 17 is formed of a material which preferably has the same velocity for an ultrasonic wave in the shear mode as does the pipe 11. The ultrasonic shear wave generated at the crystal 16 is transmitted axially along the wedge 17, through the pipe wall 11 and is mode converted by refraction at the interface between the fluid 12 and the pipe 11. The angle of refraction $\beta$ of the resultant longitudinal wave will depend upon, the angle of incidence $\alpha$ and the relative velocities of longitudinal and shear waves in the pipe wall material and in the fluid.

Table I, set forth below, shows the refracted angles in water for different tubing materials and different angles of incidence. From inspection of table I, it can be seen that an incident shear wave produces a substantially higher angle of refraction than does incident longitudinal wave. For situations where the fluid is water, an acrylic plastic wedge and pipe wall with an angle of incidence of 30° will result in an angle of refraction of 44°. This angle provides for the longitudinal wave transmitted through the fluid a very substantial component of velocity in the direction of axial flow. The second transducer 14 is formed similarly to transducer 13 and the transducers are arranged in a system, as illustrated in FIG. 2, so that each of the transducers 13 and 14 serve both as a transmitter and as a receiver.

The coupling of the acoustic energy between the wedges 17 and 20 and the pipe wall 11 may be made by bonding, such as the use of adhesive or brazing or welding, by optical contact, by pressure, or by the use of a fluid or elastomeric film. The fluid or elastomeric coupling is effective since the incident shear waves, when vertically polarized contain a vibration component perpendicular to the interface between the wedge 17 and the wall 11. In one possible application using a pressure, fluid film, or optical coupling the flowmeter device may be momentarily clamped onto a pipe to obtain a suitable measurement.

Figure 2:
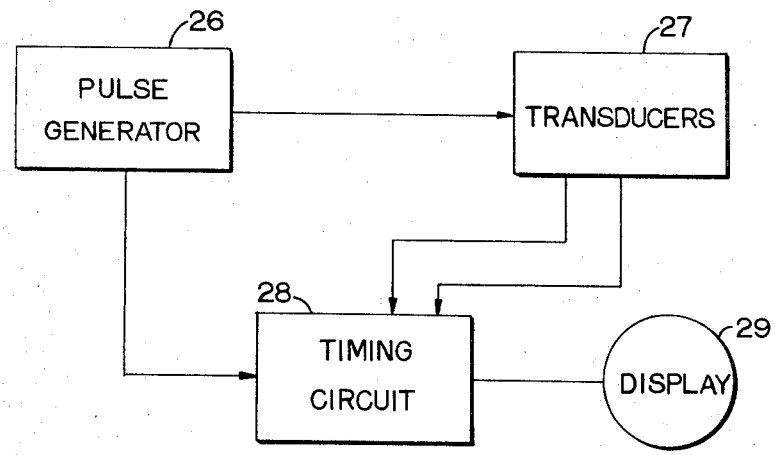
FIG. 2 is an illustration in block diagrammatic form of a measuring system including the flowmeter of this invention.

In FIG. 2 there is illustrated in block diagrammatic form a measurement system suitable for practice of the invention. A pulse generator 26 provides precisely timed exciting electrical pulses to the transducers 27 and also a timing signal to time the circuit 28. A timing pulse in the pulse generator 26 establishes an initial time when the main bang occurs at both crystals 16 and 20 causing them to emit the shear ultrasonic waves. When the waves are converted by refraction, transmitted as longitudinal waves through the fluid, reconverted and transmitted to the opposite crystal, a pair of pulses representing the reception of the two waves will occur. The difference in the time of occurrence of the two pulses will be proportional to the flow velocity of the fluid. The timing circuit 28 may take any of several forms, a typical one being a clocking circuit which digitally measures the difference between the two received pulses. The output of this timing circuit 28 is displayed on a display unit 29, which may be a digital readout, an oscilloscope or the like. While the configuration of FIG. 1 illustrates transducers on opposite sides of the conduit, it should be noted that the transducers may be located on the same side and the longitudinal waves reflected off the opposite wall to be received by the transducer on the same side.

Figure 3:
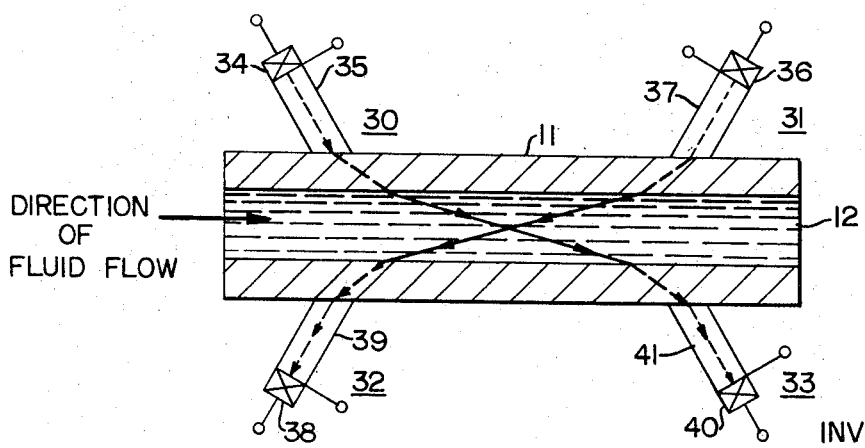
FIG. 3 is an illustration in cross-sectional view of a second embodiment of a flowmeter constructed in accordance with the principles of this invention.

In FIG. 3 an alternative embodiment of a transmission type flowmeter is shown. Rather than the single pair of transducers, illustrated in the flowmeter of FIG. 1, four separate transducers 30, 31, 32 and 33 are used in this flowmeter. Each of the transducers 30 and 31 are transmitters, with transducer 31 positioned to transmit an ultrasonic beam diagonally downstream, while transmitter 31 is positioned to transmit an ultrasonic beam diagonally upstream. Transducers 32 and 33 act only as sensors or receivers, with transducer 32 positioned to receive the ultrasonic waves transmitted diagonally upstream from transducer 31, while transducer 33 is positioned to receive the ultrasonic waves transmitted diagonally downstream from transmitter 30. Each of the transducers is formed of a shear wave crystal and a coupling wedge. As in the embodiment of FIG. 1, the wedge is formed of the same material as the pipe wall 11, where possible, and the angle of the wedge is selected, so that, in combination with the difference in velocities in materials of the pipe wall and fluid, a shear wave generated at crystal 34 is refracted at the interface between the wall 11 and the fluid 12 to produce the longitudinal wave at an angle of about 45° with the pipe wall. This longitudinal wave is reconverted at the opposite interface to a shear wave which is passed along wedge 41 and detected by crystal 40. The operation of the other pair of transducers 31 and 32 is similar, except that the ultrasonic wave is transmitted upstream.

Figure 4:
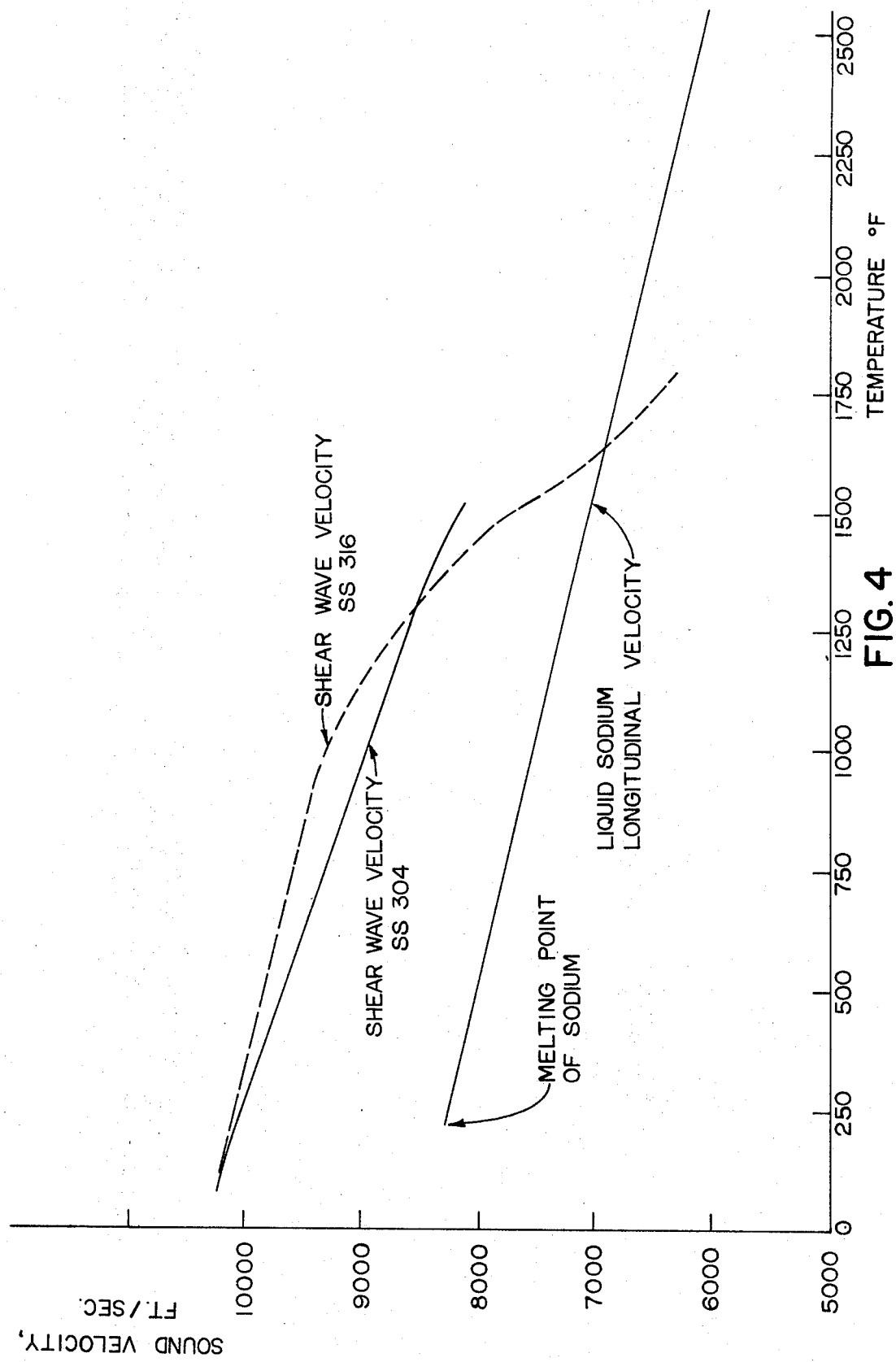
FIG. 4 is a illustration in graphical form of the variation of sound velocity in various materials as a function of temperature.

In both the embodiments of FIG. 1 and FIG. 3, the flow velocity is related to the difference in transit times between the passage of the ultrasonic wave upstream and downstream. There are a number of techniques for measuring this difference in transit time, with the particular technique used depending upon the time precision necessary. This time precision will, in turn, depend upon the flow velocity and the distance involved. In FIG. 4 there are illustrated the shear wave velocities as a function of temperature in stainless steel 304 and 316, which are typical pipe wall materials. Additionally the longitudinal wave velocity in liquid sodium is shown as a function of temperature. Reference can be made to FIG. 4 as an aid in determining the difference in transit time to be expected for the specific case of a 10-inch internal diameter stainless steel 304 pipe containing, as a fluid, liquid sodium at a temperature of 1,000° F. At this temperature the velocity of a longitudinal wave in sodium is, $V_L$=7,531 feet per second
=0.0905 inches per microsecond.

With a longitudinal wave launched at 45° diagonally across the pipe and under the conditions of no-fluid flow, the transit time $t$=156 microseconds. At this same temperature the shear wave velocity in stainless steel 304 is 0.108 inches per microsecond (about 10 percent higher than the velocity of the longitudinal wave in sodium at that temperature). From Snell's law, it can be shown that a shear wave at an angle of incidence of 53.5° will produce a longitudinal wave at 45°. It TABLE I.—REFRACTED ANGLES IN WATER, IN DEGREES, AS A FUNCTION OF TUBING MATERIAL FOR ANGLES OF INCIDENCE OF 30, 45 AND 60 DEGREES

| Material | Tubing characteristics | | | Angle of incidence | | | | | |
|---|---|---|---|---|---|---|---|---|---|
| | $V_L$, cm./μsec. | $V_T$, cm./μsec. | σ | 30° | | 45° | | 60° | |
| | | | | Long. | Shear | Long. | Shear | Long. | Shear |
| Pyrex | 0.564 | 0.328 | 0.24 | 7.6 | 13.1 | 10.8 | 18.7 | 13.2 | 22.2 |
| Stainless steel (347) | 0.579 | 0.310 | 0.30 | 7.4 | 13.9 | 10.5 | 19.9 | 12.8 | 24.6 |
| Acrylic plastic | 0.262 | 0.107 | 0.40 | 16.5 | 44.1 | 23.7 | 80.0 | 27.5 | | should be noted that under these conditions a longitudinal wave generated in the stainless steel pipe could not launch a longitudinal wave at 45° across the fluid. As shown in FIG. 4 the velocity of a shear wave in stainless steel 316 exactly equal to the velocity of a longitudinal wave in liquid sodium at approximately 1,600° F. Thus at this temperature, which is not an unreasonable operating temperature for the sodium coolant in certain nuclear reactors, there would be no change in the beam direction at the interface between the pipe and the liquid sodium, despite the mode change from shear to longitudinal.

In the specific case of liquid sodium flowing through a stainless steel 304 pipe, as described above, a fluid flow velocity in the range between 30 and 100 feet per second will result in the sound beam being carried from 0.03 to 0.1 inches away from the no-flow path, resulting in a transit time difference between 0.7 and 2 microseconds. If the exciting pulse which generated this shear wave is a 0.3 microsecond wide video pulse, then about 100 microseconds after the main band two pulses would be received with a time difference between the latter two pulses lying between 0.7 and 2 microseconds, the exact value being dependent upon the precise flow velocity. This interval can be measured with a counter or EPUT meter and a time resolution of 0.1 microseconds would correspond to a flow sensitivity of about 3.5 feet per second, which corresponds to a 10 percent accuracy at a flow rate of 30 feet per second and about a 3 percent accuracy at a flow rate of 100 feet per second.

Another method of measuring this difference in transit times is to use continuous wave excitation and measure the phase shift. For an exciting frequency of 3 MHz. and flow rates of approximately 15 feet per second a phase difference of 25° per foot/second is obtained. If this phase difference can be measured to an accuracy of 1° this corresponds to a flow sensitivity of 0.5 inches per second. While this accuracy is excellent for flow rates up to about 15 feet per second, at higher rates the measurement may become ambiguous due to shifts in excess of 360°.

Figure 5:
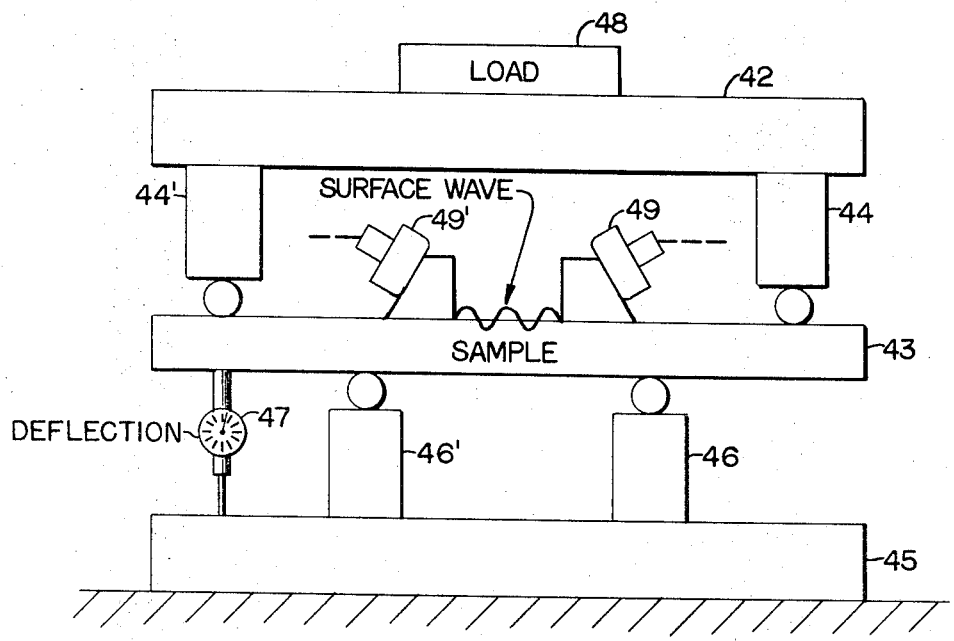
FIG. 5 is an illustration in perspective view of a phase shift detector useful in the practice of this invention.
Figure 6:
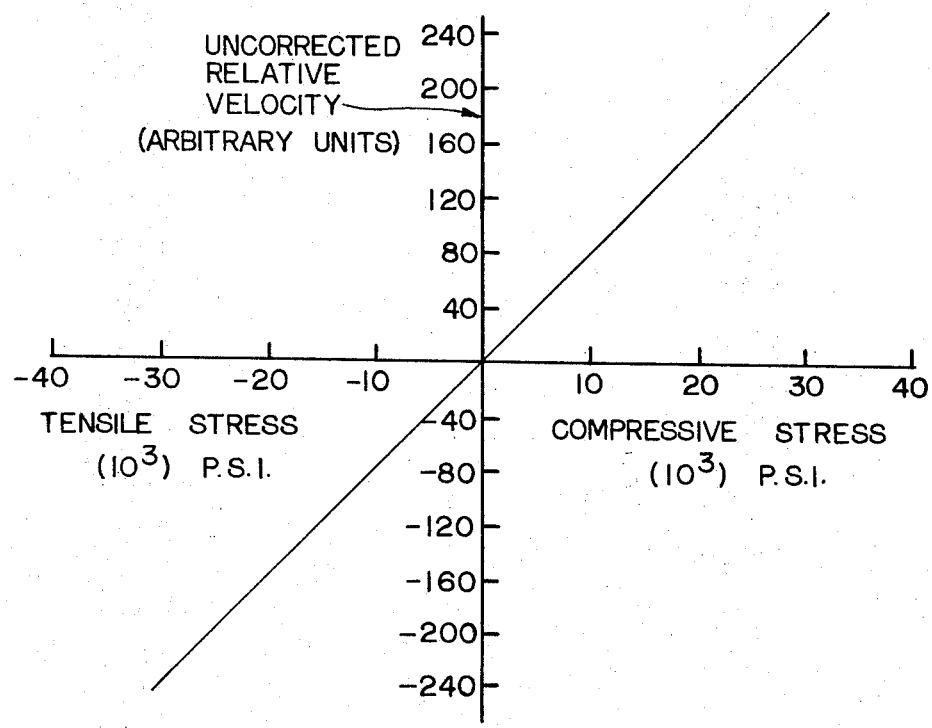
FIG. 6 is an illustration in graphical form of the variation in surface wave velocity along the material as a function of the stress placed on the material.

In FIG. 5 there is illustrated a device for precisely measuring the phase shift. The phase shifter illustrated in FIG. 5 operates on the principle that sound velocity in a material depends to a small degree on stresses in the material. This apparatus is essentially the same as a device used for measuring the change in surface wave velocity with stress, as reported by R. W. Benson in NASA Annual Report, Jun. 30, 1966 entitled Development of Nondestructive Methods for Determining Residual Stress and Fatigue Damage in Metals. In particular, the device illustrated depends upon the velocity change induced by stress in the transmission of Rayleigh waves. A sample material 43 which may be any suitable solid is positioned between a pair of bending members 42 and 45 which constitute a loading frame. By applying a load at 48 and 48' the sample 43 is bent, thereby providing tensile stress on the upper surface as a result of the load being applied to the upper surface between wide-spaced fulcrum points 44 and 44', while a load is applied at the lower surface between the more narrowly spaced fulcrums 46 and 46'. The amount of deflection of the sample can be measured by a meter 47 which records the translational movement of the end of the sample 43 with respect to the fixed member 45. If now a signal is applied to the transmitter transducer 49' to generate a Rayleigh, or surface wave, along the upper surface of the sample element 43, which wave is received at receiver member 49 and converted back into an electrical signal, the delay between the electrical signal which is applied to the sender transducer 49' and the electrical signal which is produced by the receiver transducer 49, will be a function of the amount of bending moment applied to the sample 43. In FIG. 6, there is illustrated in graphical form the relative velocity of a surface wave, in arbitrary units, (uncorrected for strain) as a function of tensile and compressive stress.

If the fluid velocity in an apparatus as shown in FIG. 1 or FIG. 3 is in a known direction, then the output of the transducer which receives the signal transmitted downstream can be used to excite the sender transducer 49 and the output from the receiver transducer 49' can be compared, for example, on an oscilloscope to the ultrasonic wave received by the upstream transducer. By varying the load applied at 48 these two waves can be brought into coincidence. The amount of load required to produce the coincidence is then directly related to the phase shift induced by the fluid flow velocity.

A similar phase shift detector is illustrated in FIG. 7. In the device of of 7, however, the direction of fluid flow need not be known. As shown a bar member 57 is supported at either end at pivots which permit deflection of the bar in either direction vertically. On one end of the upper surface of the bar is located a transmitter transducer 52 and at the opposite end of the same surface is located a receiver transducer 54. Similarly on the bottom surface of the bar at one end is located a second transmitter transducer 53 and at the opposite end of the same surface there is a receiver transducer 55. The upper transmitter 52 is connected electrically to one receiver transducer of an apparatus, as illustrated in FIG. 3, while the lower transmitter 53 is electrically connected to the second receiver transducer 33 of that same apparatus. A force is applied to the center of the bar 57 through the spindle 50 of a micrometer 50' and the position of the micrometer is read out on a gauge 51. The upper receiver transducer 54 is electrically connected to one input of an oscilloscope 56, while the lower receiver transducer 55 is electrically connected to the second input of the same scope.

In operation the micrometer 50' is turned to vary the load on the center of the bar member 57 until the wave forms, resulting from the signals received by the upper transducer 54 and the wave form resulting from the signals received by the lower transducer 55 are brought into time coincidence. Since varying the load through the spindle 50 tends to compress one surface of the bar 57, while stretching the other, the change in position of the micrometer 50', as indicated by gauge 51, is a direct measure of the difference in phase between the signals received at crystal 32 and those received at crystal 33. A very fine control of this ultrasonic phase shifter is achievable since the change in velocity of the surface wave is small for even large stresses. If the delay of the strip is dispersive with respect to frequency, then pulses of about 10 cycles duration may be used with small chance of ambiguity, since superposition will occur at a single valued phase shift compensation. Also, while the above phase shifter employed Rayleigh waves, a similar effect may be obtained using shear or longitudinal waves within a material which is stressed.

As previously described, a second general technique for determining the flow rates utilizing longitudinal ultrasonic waves is based upon the Doppler effect. Ultrasonic energy backscattered from stationary particles in a fluid is transmitted back at the same frequency as the emitted wave. However, if the backscattering particles are in motion the backscattered waves are shifted in frequency by an amount which depends upon the average particle velocity in the scattering center. In the flowmeter apparatus illustrated in FIG. 8, a signal generator 58 produces a pulsed continuous wave-exciting signal at a known frequency, for example, 5 MHz. This signal is used to excite shear wave crystal 60 which transmits a shear wave into the pipe wall 68 and this shear wave is mode converted at the interface between the pipe wall 68 and the fluid 61 into a longitudinal wave launched diagonally into the fluid. The longitudinal wave 67 is scattered at 64 from a particle, which may either be a particle carried by the fluid, an eddy or bubble. Some of the ultrasonic energy scattered by the particle 64 will be received by the receiving transducer 60'. The receiving transducer 60', is sensitive to shear waves which are generated by the longitudinal wave incident upon the wall 68. The frequency of these received waves is compared in a conventional frequency detector 59 to that of the generated signal from the transducer 60. The shift in frequency is then directly related to the motion of the particle 54 and hence of the fluid stream. While a separate crystal 60' is used as a receiving transducer, it will be apparent that the same crystal 60 may be employed as both a transmitter and receiver.

If the frequency detector 59 employs time range gating, then the observed frequency shift may be related to the radial distance $a$ at which the scattering center is located relative to the axis. By a sequence of measurements in which the gated time range is advanced stepwise the flow velocity, $u$, as a function of the radius $r$ can be measured from $r=0$ to $r=R$ where $R$ is the radius of the pipe. In a round cylindrical pipe the amount of fluid transported in an axial direction may be considered as being transported in a number of concentric cylindrical shells of thickness $\Delta r$. While each of the shells are the same thickness $\Delta r$, the cross-sectional area is $2\pi r\Delta r$ and hence increases in direct proportion to $r$. Accordingly the outer shells transport more fluid per shell than the inner ones, even for uniform flow velocity over the entire cross section. For nonuniform flow then the sum of the contribution from each shell weighted by the amount of area in that shell, provides the most accurate measurement of total flow. For infinitesimally thin shells then the rate of flow equals $$2\pi \int_{r=0}^{R} u(r)dr$$

where $u(r)$ is the flow velocity derived from an ultrasonic measurement localized at the radius $r$. By sweeping the range gate so that the intersection of the incident beam 67 and the scattered beam 67' varies from $r=0$ to $r=R$, the precise measurement of this total flow is obtained. A similar technique may be employed to obtain a profile along the z-axis of the pipe.

Figure 9:
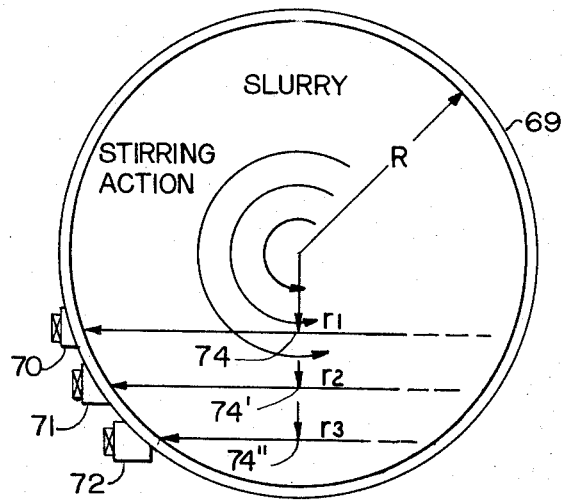
FIG. 9 is an illustration in partially cross-sectional and partially in diagrammatic form of a flowmeter constructed in accordance with the principles of this invention.

There are some circumstances in which it is not axial flow, but flow around the circumferences in the $\theta$ direction which is important. In FIG. 9 there is illustrated a configuration for stirring a barrel 69 of fluid material. In this configuration a series of transducers 70, 71 and 72 are positioned to emit longitudinal beams, resulting from refraction of shear waves at the interface along chords of the circle formed by the barrel. Each of the transducers 70, 71 and 72 are both transmitters and receivers and pulses of ultrasonic waves scattered at 74, 74' and 74'' will be Doppler shifted according to the local flow velocity at the radii, $r_1$, $r_2$, and $r_3$. The refraction produced by an incident shear wave is about half of that which would have been produced by the incident longitudinal wave and thus facilitates maintaining the beams from each of the transducers parallel to one another. The flow gradient between the velocity measured at radius $r_1$ and that measured at $r_2$ can provide a measure of the fluid viscosity, $\eta$.

Figure 10:
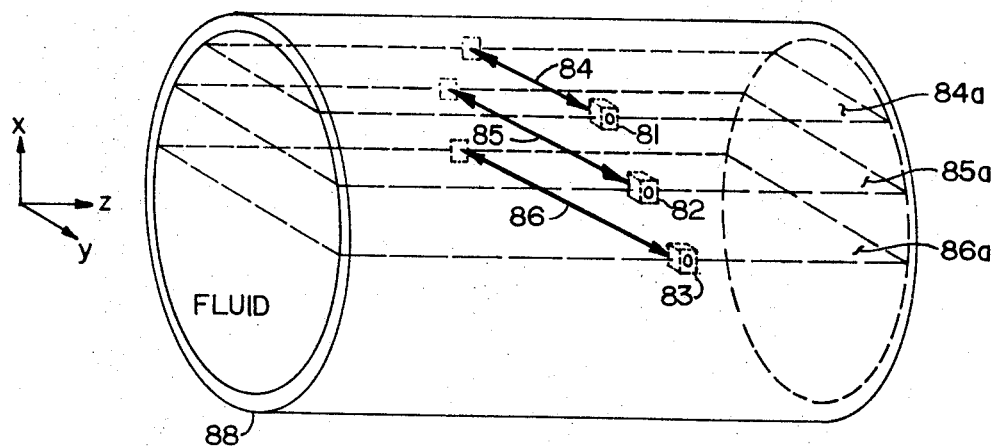
FIG. 10 is an illustration partially in perspective and partially in diagrammatic form of a flowmeter system constructed in accordance with the principles of this invention.

A profile of the flow rates for axial flow in a pipe can also be measured by a transmission-type apparatus. Such an arrangement is shown in FIG. 10 in which three transducers 81, 82 and 83 are positioned on the pipe wall 88 to emit longitudinal waves, 84, 85 and 86 generated by refraction at the interface, at a compound angle across chords of the cylinder. The angle of the wedge assemblies is arranged so that the beams are propagated in the planes 84a, 85a, and 86a, which are shown as planes parallel to the YZ-plane. These assemblies are also shaped in the Z-direction to provide a generally diagonal path of the beams with respect to the direction of flow so that a substantial component of their velocities is parallel to the axis of the flow of the fluid.

Figure 11:
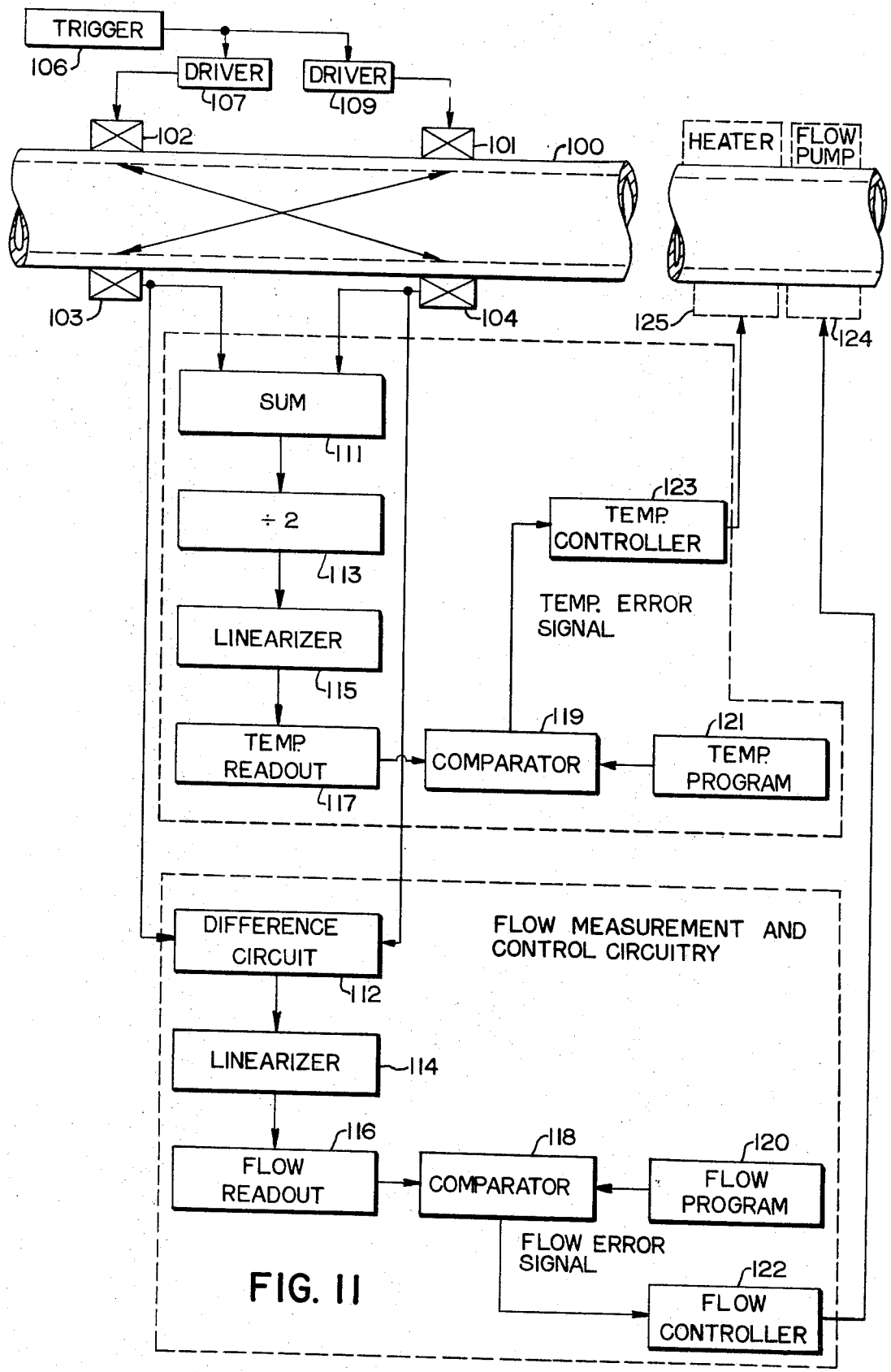
FIG. 11 is an illustration in block diagrammatic form of a total flow and temperature measurement control system constructed in accordance with the principles of this invention.

In FIG. 11 there is illustrated a system for controlling the flow rate of a fluid material in a conduit and, at the same time controlling the temperature. The measurements of temperature and flow rate which provide the basis for this control are both accomplished ultrasonically utilizing the ultrasonic flowmeter of this invention. The fluid is flowing through a conduit 100 on which are mounted transmitting shear wave transducers 101 and 102 and receiving shear wave transducers 103 and 104. These transducers are coupled to the conduit 100 in the fashion illustrated in FIG. 3 and form the basic flowmeter configuration of FIG. 3. A pair of driver elements 107 and 109 serve to couple electronic trigger unit 106 to the transmitting transducers 102 and 101 to provide for pulse operation of these transducers.

The outputs from the receiver transducers 103 and 104 are each coupled into a summing unit 111, which provides as its output the sum of the transit times for the respective ultrasonic waves. This output is coupled to a divide-by-two unit 113 and the output of this divider is connected through linearizer 115 to a temperature readout unit 117. The temperature of the fluid will depend directly upon the transit time over a given path length of an ultrasonic wave through the fluid. By adding the diagonal upstream transit time to the diagonal downstream transit time and dividing by two, the first order effects of the flow velocity of the fluid are canceled out and the signal received by the temperature readout unit 117 is therefore directly indicative of temperature. The summing unit 111 and divide-by-two unit 113 are conventional electrical equipment and the linearizer 115 is an electronic weighting unit which can match the particular fluid curve to the readout unit 117. This readout unit may, for example, be either analog or digital in form.

The temperature control is achieved by applying a control signal to a heater unit 125 which surrounds the conduit 100. The control signal is developed by providing the output of the temperature readout unit 117 as one input to a comparator unit 119, the other input to this comparator being provided from a temperature program unit 121. The temperature program unit 121 provides an input signal indicating the appropriate temperature and the comparator 119 then develops a signal representing an inequality between the temperature readout signal from unit 117 and the temperature from the program unit 121. The nature of the comparator will, of course, depend upon whether the comparison is digital or analog. In either circumstance there are a number of conventional units to perform this function. The output from the comparator unit 119 is provided as a signal to the temperature-controlling unit 123 which in turn controls the heater 125. The nature of the temperature-controlling unit 123 may be either one where the magnitude of the difference signal produced by comparator unit 119 increases the current supplied to a conventional heater 125 or may be a time-based unit in which the duty cycle of a heater unit 125 is controlled by the amount of time that the temperature-controlling signal from unit 123 is present.

The flow control is provided by taking outputs from the two receiver units 103 and 104 applying it to a difference circuit. The output from the difference circuit is supplied again through a linearizer to a flow readout unit 116. The linearizer 114 serves a similar function as does linearizer 115, that is to adjust the magnitude of the signal for various fluids to operate the flow readout 116 properly. Since the difference in the transit time of ultrasonic pulses transmitted in the upstream and downstream direction is directly related to flow velocity, then this signal at flow readout unit 116 is indicative of the fluid flow velocity.

In order to control the flow rate a flow pump 124 is positioned to speed up or retard the flow of fluid through the conduit 100 and this flow pump is controlled by a signal from a flow controller 122. The comparator 118 which receives as one input the output from flow readout terminal 116 and as the other input a flow program signal 120, produces the error signal to the flow controller 122. The exact nature of the flow controller 122 will depend upon the particular type of pump being employed and, as in the case of the temperature control, this controller may either be a time-based unit or one which varies the amount of electrical power to the pump and thereby increases or decreases the pumping rate. The comparator form will again depend upon whether the signals are being generated in an analog or digital fashion.

Having described the invention, various modifications and improvements will now occur to those skilled in the art and the invention should be construed as limited only by the spirit and scope of the appended claims.

I claim:
1. A flowmeter for measuring the flow of a fluid material within a conduit comprising:
   an ultrasonic shear wave generator for generating ultrasonic waves in the shear mode;
   coupling means coupling said shear wave generator to said conduit without penetrating through said conduit at an oblique angle so that said generated shear waves are incident on the interface between said fluid and said conduit at an angle such that refracted longitudinal waves are launched into said fluid material with a substantial component of their velocity in a direction parallel to the direction of flow of said fluid; and means for measuring the variation in propagation of said longitudinal waves through a portion of said fluid stream as indicative of variations in said fluid flow rate.

2. A flowmeter for measuring the velocity of a fluid flowing within a conduit comprising:
an ultrasonic shear wave generator for generating shear waves and coupling means coupled to said conduit without penetrating through said conduit for propagating said shear wave into oblique incidence with the interface between said conduit and said fluid to produce, by refraction, longitudinal waves having a substantial component of their velocity in a direction parallel to the direction of flow of said fluid, a portion of said generated longitudinal waves being propagated with a component directed opposite to the flow of said fluid and a portion of said longitudinal waves being propagated with a component in the direction of flow of said fluid; and
measuring means coupled to said conduit at a position displaced from said generating means in the direction of said flow, said measuring means detecting shear waves produced in said flow, said measuring means detecting shear waves produced in said conduit by refraction of said transmitted longitudinal waves and providing an output signal indicative of the difference in transit time for said ultrasonic portions traveling with and against the direction of flow of said fluid.

3. A flowmeter in accordance with claim 2 wherein said shear wave generator is formed of a first shear wave crystal and a first coupling member, and a second shear wave crystal and a second coupling member, said first coupling member being coupled between said first shear wave crystal and said conduit, said second coupling member being coupled between said second shear wave crystal and said conduit at a position on said conduit displaced from said first shear wave crystal in the direction of flow of said fluid, said first and second crystals being excited simultaneously to produce longitudinal waves having components in the direction of and opposite to the direction of flow of said fluid, said first and second shear wave crystals serving as sensors for said measuring means.

4. A flowmeter in accordance with claim 3 wherein said first and said second shear wave crystals are both coupled to the same side of said conduit.

5. A flowmeter in accordance with claim 3 wherein said first and said second shear wave crystals are coupled to said conduit on diagonally opposite sides of said conduit.

6. A flowmeter in accordance with claim 2 wherein said shear wave generator and said measuring means are momentarily coupled to said conduit.

7. A flowmeter in accordance with claim 2 wherein said shear wave generator is formed of at least two shear wave crystals coupled to said conduit at positions displaced from one other in the direction of flow of said fluid and wherein said shear wave crystals are simultaneously excited to produce shear waves which result in the propagation of longitudinal waves diagonally upstream and diagonally downstream across said fluid and wherein said measuring means comprises means for measuring the time difference between pulses received at said measuring means which result from the reception of ultrasonic waves transmitted downstream along said diagonal and those which have been transmitted diagonally upstream.

8. A flowmeter in accordance with claim 7 wherein said first and second shear wave crystals are excited simultaneously with several cycles of continuous wave energy and wherein said measuring means includes a phasemeter for providing an output indication of the phase difference between the pulses received at said measuring means which have been transmitted diagonally upstream and the pulses received at said measuring means which have been transmitted diagonally downstream.

9. A flowmeter in accordance with claim 7 wherein said measuring means is comprised of means for shifting the phase of a signal received from one of said diagonal paths with respect to the signal received from the other of said diagonal paths and wherein said phase-shifting means can be controlled, whereby the amount of variation in said phase-shifting means required to produce phase coincidence between said signals is indicative of the velocity of flow of said fluid material.

10. A flowmeter for measuring the velocity of a fluid flowing within a conduit comprising:
an ultrasonic shear wave generator for generating shear waves;
coupling means coupled to said conduit without penetrating through said conduit for propagating said generated shear waves into oblique incidence with the interface between said conduit and said fluid to produce, by refraction, longitudinal waves having a substantial component of their velocity in a direction parallel to the direction of flow of said fluid, a portion of said generated longitudinal waves being propagated with a component directed opposite to the flow of said fluid and a portion of said longitudinal waves being propagated with a component in the direction of flow of said fluid;
first transducing means coupled to said conduit in a position to receive shear waves produced in said conduit by refraction from that portion of said generated longitudinal waves which was propagated with a component directed opposite to the flow of said fluid for producing output electrical signals in response to said received shear waves;
a second transducing means coupled to said conduit in a position to receive shear waves produced in said conduit by refraction of that portion of said transmitted longitudinal wave which was propagated with a component in the direction of flow of said fluid for producing output electrical signals in response to said received shear waves; and
means for measuring the difference in propagation of the ultrasonic portions of the longitudinal wave traveling with and against the direction of flow of said fluid, said means for measuring the difference in propagation comprising:
a phase shifter for shifting the phase of a signal received from one of said transducers with respect to the signal received from the other of said transducers, said phase shifter including a solid member, means mounted on said solid member for transmitting an ultrasonic wave along said member in response to output signals from one of said transducers, means for sensing the ultrasonic wave transmitted along said solid member and for controllably stressing said solid member, thereby varying the transit time of the transmitted ultrasonic waves along said member and output means providing an output signal indicative of the amount of stress required to produce phase coincidence between signals from the one of said transducers coupled to said phase shifter and from the other of said transducers.

11. A flowmeter in accordance with claim 7 wherein said measuring means comprises third and fourth shear wave crystals, said third shear wave crystal being coupled to said conduit at a position diagonally opposite said first shear wave crystal and said fourth shear wave crystal being coupled to said conduit at a position diagonally opposite to said second shear wave crystal, said third and fourth shear wave crystals producing in response to longitudinal waves incident upon the adjacent section of said conduit electrical output signals.

12. A flowmeter for determining the velocity of flow of a fluid within a conduit comprising:
a first shear wave generator and means coupling said first shear wave generator to said conduit without penetrating said conduit to produce at the interface of said conduit and said fluid a longitudinal wave, a substantial component of velocity of said longitudinal wave being in a direction parallel to the direction of flow of said fluid;

means for exciting said shear wave generator to launch shear waves having a substantial portion of their spectral energy at a specific frequency;

sensing means for sensing longitudinal waves backscattered from said fluid; and frequency detection means for measuring the difference between the frequency of the sensed backscattered waves and the frequency at which said shear waves were launched, said frequency difference providing an output indication of the velocity of flow of said fluid.

13. A flowmeter in accordance with claim 12 wherein said conduit is a pipe, and wherein said longitudinal wave is launched diagonally across said pipe, and including time range gating means for actuating said sensing means at a succession of predetermined times after the excitation of said shear wave generator, each of said succession of times corresponding to a backscattering point in said fluid which occurs at a different position in said fluid stream.

14. A flowmeter in accordance with claim 13 and providing an output indication of the velocity gradient between specific radial points in said fluid stream as indicative of the viscosity of said fluid.

15. A flowmeter in accordance with claim 12 wherein said shear wave generator is formed of a first shear wave crystal coupled through a coupling wedge to said conduit and wherein said sensing means is a second shear wave crystal displaced from said first so that the sensing field of said sensing means intersects the longitudinal wave transmitted diagonally through said fluid at a predetermined radial position.

16. A flowmeter in accordance with claim 15 and including summing means for summing each of the values of flow velocity obtained for radial points across said fluid stream, and for providing appropriate weighting factors to each of said radial positions said weighting factors corresponding to the relative total area of fluid flowing at said radial positions, whereby a true total flow velocity is obtained.

17. A ultrasonic phase shifter for use in an ultrasonic flowmeter comprising:

a strip element having first and second opposed surfaces;

first means for transmitting a surface wave between two predetermined points on said first surface and second means for transmitting a surface wave between two predetermined points on said second surface;

means for controllably varying the stress on said strip along each of said opposing surfaces in a manner to increase the surface wave velocity on one surface while decreasing the surface wave velocity along the opposed surface, the amount of stress serving to control the phase shift between signals produced by sensors positioned to receive the respective surface waves; and means for determining the amount of stress applied to produce coincidence between signals produced by sensing the surface waves on said first surface and those produced by sensing surface waves on said opposing surfaces, and for indicating said amount of stress to indicate the amount of phase shift introduced.

18. A flowmeter in accordance with claim 13 wherein said shear wave generator is formed of a first shear wave crystal coupled through a coupling wedge to said conduit and wherein said sensing means is a second shear wave crystal displaced from said first so that the sensing field of said sensing means intersects the longitudinal wave transmitted diagonally through said fluid at a predetermined radial position.

UNITED STATES PATENT OFFICE
CERTIFICATE OF CORRECTION

Patent No. 3,575,050     Dated April 13, 1971

Inventor(s) Lawrence C. Lynnworth

It is certified that error appears in the above-identified patent and that said Letters Patent are hereby corrected as shown below:

Column 6, line 4 reading

"device of of 7, however, the direction of fluid flow ne not be"

should read

--device of Fig. 7, however, the direction of fluid flo need not be--

Column 7, line 27 reading

"but flow around the circumferences in the $\theta$ direction which is"

should read

--but flow around the circumferences in the 0 direction which is--

Column 9, lines 26 & 27 reading

"said flow, said measuring means detecting shear waves produced in said flow, said measuring means detecting"

should read

--said flow, said measuring means detecting--

Signed and sealed this 9th day of November 1971.

(SEAL)
Attest:

EDWARD M. FLETCHER, JR.
Attesting Officer

ROBERT GOTTSCHALK
Acting Commissioner of Pat